3,255,144
COATING COMPOSITIONS COMPRISING MIXTURES OF BUTYL RUBBER AND POLYVINYLIDENE CHLORIDE LATICES
Morton Fefer, Metuchen, and John R. Condon, Clinton Township, Hunterdon County, N.J., assignors to Esso Research and Engineering Company, a corporation of Delaware
Filed Dec. 31, 1962, Ser. No. 248,554
2 Claims. (Cl. 260—29.7)

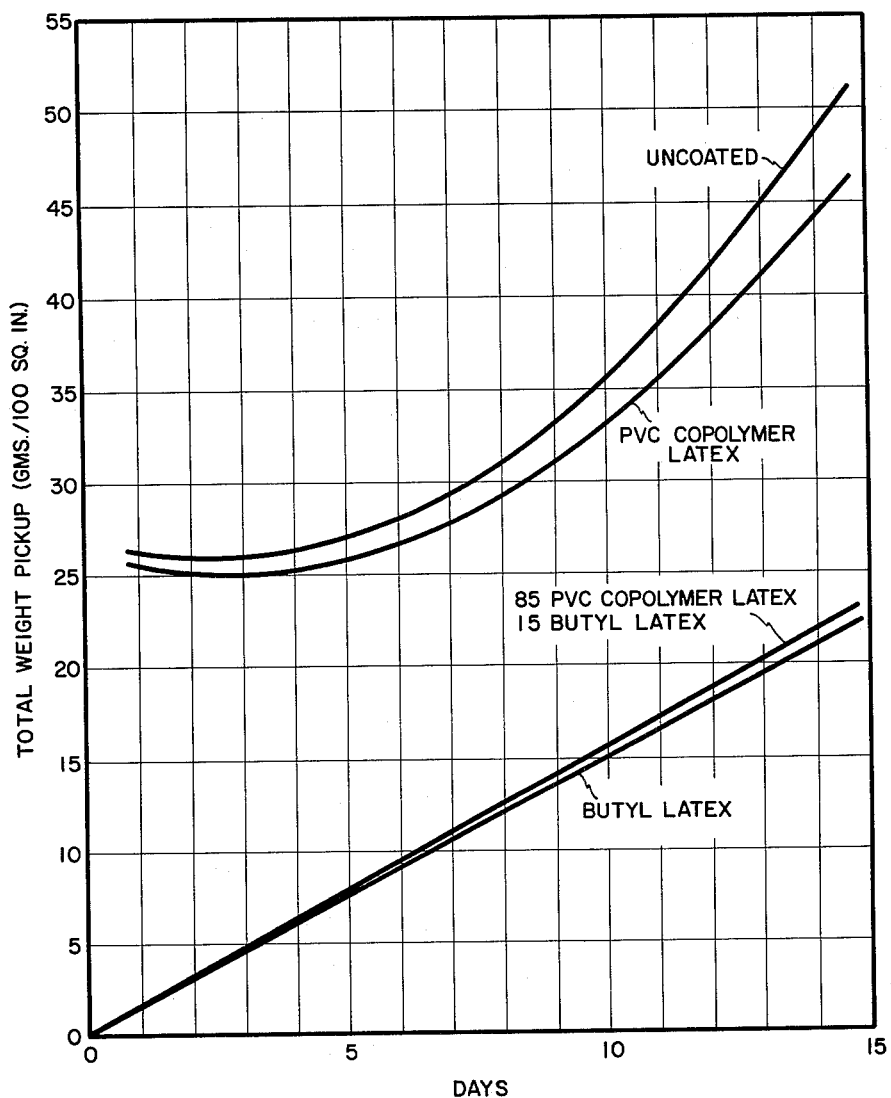

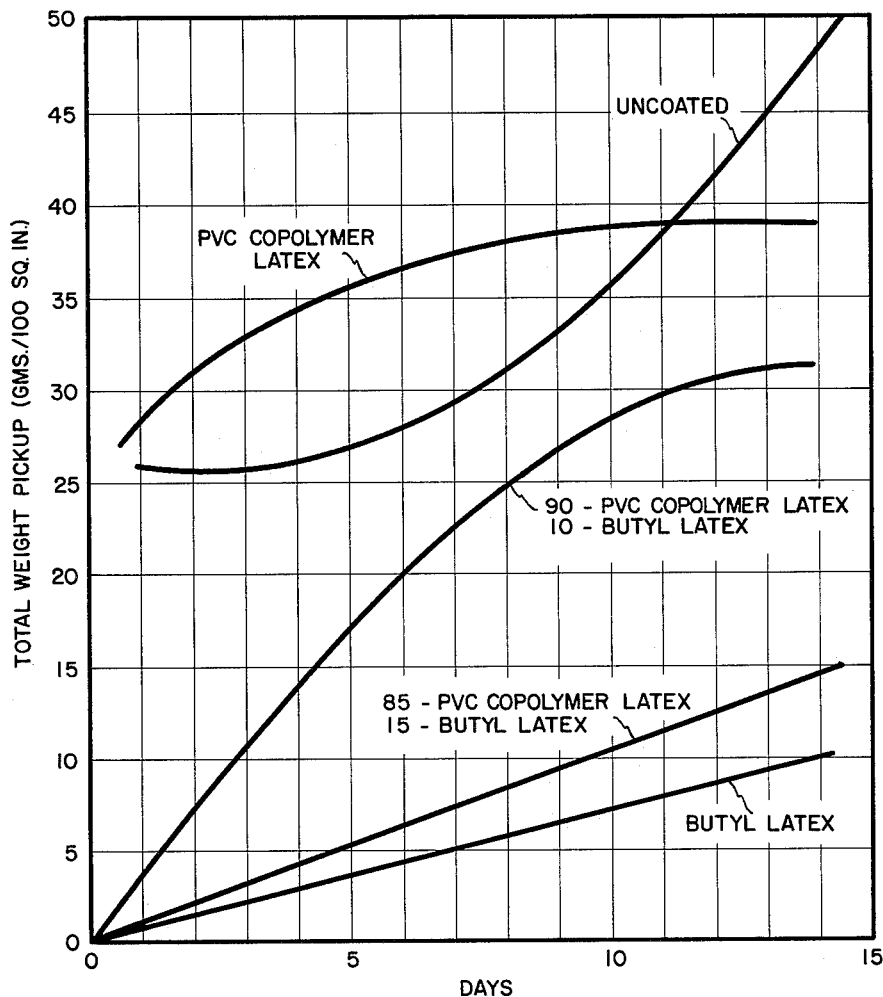

The present invention deals with an improved coating composition. More particularly, it relates to a coating composition having good properties, especially with regard to flexibility, chemical resistance, heat stability and water permeability, by the use of a combination of a polyvinylidene chloride latex and an elastomer latex, particularly that of butyl rubber.

In recent years water-based coating compositions have proven to be increasingly popular. Conventionally, they are made by the use of dispersions of materials such as vinyl chloride, vinylidene chloride, resinous styrene-butadiene copolymers, vinyl acetate polymers, etc., together with conventional fillers such as titanium dioxide and the like. Such coatings offer advantages over solvent-based coatings with respect to ease of application, as well as mild odor.

While coating compositions are widely used, there remain many improvement areas. When employing relatively brittle high unsaturation binder materials such as styrene-butadiene resins, excessive brittleness tends to occur during aging as the high styrene resins continue to harden. Conventional emulsion coatings which resist embrittlement generally employ relatively high cost materials. In addition, many of the resinous binders employed are not film-forming at low temperatures and the films may flake or crack when applied at low temperatures. Although some of these coatings are excellent barrier coatings for moisture and gases, particularly those prepared from polyvinylidene chloride, they do not form satisfactory continuous coatings over porous or rough surfaces. This necessitates the use of a precoat to seal the surface and enable the formation of a continuous coating at economical coating weights.

Means have now been found for obtaining a coating composition which is relatively low cost and exhibits good properties as to flexibility, chemical resistance, moisture permeability and particularly with respect to ability to coat porous and rough surfaces. In accordance with the present invention, by employing as the binder a combination of a major portion of a polyvinylidene chloride latex and a minor portion of an elastomer in a latex form, a coating composition is obtained which is free of the disadvantages heretofore characteristic when rubbers were employed as binding agents. The good features of an elastomer latex and polyvinylidene chloride emulsions are combined and the poor features of both eliminated when the two are blended in a ratio of resin to rubbery particles of from about 95/5 to 50/50 on a solids to solids weight basis.

The polyvinylidene chloride may be employed as such but it is often desirable to use a copolymer of vinylidene chloride with an ester of an unsaturated acid and an alcohol having up to 10 carbon atoms. Suitable unsaturated acids are the monobasic acids acrylic, alpha and beta methacrylic, crotonic, isocrotonic, vinylacetic, ethyl acrylic, beta, beta-dimethyl acrylic, beta-pentenoic, allylacetic, angelic, tiglic, sorbic, hydrosorbic, isohydrosorbic, pyroterebic, teracrylic, decenoic, undecylenic, myristolenic, oleic, isooleic, petroselic, enicic, brassidic, cetoleic, nervonic, beta-vinyl acrylic, geranic, linoleic, dehydrogeranic, linolenic, elaestearic, licanic, clupanodonic, the dibasic acids methylene malonic, maleic, citraconic, mesaconic, itaconic, dimethyl maleic, ethyl maleic, methyl itaconic, methyl ethyl maleic, diethyl maleic, glutaconic, muconic, decapentaene 1,10-dicarboxylic.

The elastomer constituent is preferably a polymer of a $C_4$ to $C_7$ isoolefin, e.g., isobutylene, 2-methyl 1-butene, etc., or copolymer thereof with 0.5 to 15 wt. percent of a $C_4$ to $C_{14}$ multiolefin, e.g., myrcene, isoprene, butadiene, etc. The polymer and copolymer have a Staudinger molecular weight between about 20,000 to 300,000, while the copolymer has an unsaturation level (characteristically substantially lower than other rubbery polymers) represented by an Iodine number between about 0.5 to 20. The copolymer is well known in the art as butyl rubber. For example, see "Synthetic Rubber" by G. S. Whitby (1954) and U.S. Patent No. 2,356,128 to Thomas et al. describing its preparation. As used in the specification and claims, the term "butyl rubber" denotes the above type of rubbery copolymer. By employing a butyl rubber latex characterized by its low degree of unsaturation in conjunction with a polyvinylidene chloride latex not only does the composition form excellent barrier coating for moisture and gases, but it easily forms a continuous coating over porous and rough surfaces.

It is well known to produce latices of Butyl rubber by any number of methods. For example, a solution of Butyl rubber in a hydrocarbon or other solvent, particularly a $C_4$ to $C_{10}$ aliphatic, may be emulsified with water, particularly in the presence of a salt of a $C_8$ to $C_{18}$ organic sulfate ester and a monovalent salt of dihydrogen orthophosphate. The organic solvent may then be stripped, leaving a rubber-water dispersion. Alternatively, the latices may be prepared by working dispersion agents into the already dried polymer and gradually adding water. A more detailed description of the preparation of the butyl rubber latices may be had by referring to co-assigned U.S. Patent No. 2,595,797, among others. In general, the following emulsifiers are preferred for the butyl rubber latices: sodium or ammonium salt of nonylphenoxy (polyethyleneoxy) sulfate, sodium salt of sulfate ester of polyethylene oxide adduct of tridecyl alcohol, polyethylene oxide adduct of dodecyl phenol. Other emulsifiers include the fatty alcohol sulfates having the formula $MRSO_4$ where M is sodium, potassium, ammonuim, triethanolamine and diethanolamine and R is lauryl, oleyl, cetyl or their ethoxylated derivatives. A particularly suitable emulsifier in this class is sodium lauryl sulfate. Polyisobutylene latices may be prepared by the same general methods.

Although less desirable, other elastomers may be employed in the compositions of the present invention. Examples thereof are natural rubber, butadiene-styrene rubbery copolymers, polyisoprene, cis-butadiene, chloroprene, silicone rubbers, and rubbery acrylates. If desired, the elastomer latex, particularly butyl rubber latex, may be diluted with up to 50 wt. percent of petroleum resins, prepared by the Friedel-Crafts polymerization of steam-cracked petroleum fractions without harming the barrier properties of the butyl rubber.

The polymers and copolymers of vinylidene chloride used in this invention are produced by polymerizing the vinylidene chloride with agitation by emulsion polymerization in the presence of suitable emulsifying agents such as sodium laurate, ammonium naphthalene sulfonate and sodium lauryl sulfate by means of a peroxide type catalyst such as hydrogen peroxide, benzoyl peroxide, ditertiary butyl peroxide, cumeme hydroperoxide or the like at temperatures of between about $-50°$ C. to $+250°$ C. and preferably between $-20°$ C. and $+150°$ C. A polyvinylidene chloride polymer is produced having a specific viscosity of between about 0.70 and 1.40 (ASTM–

1243–52T). A particularly suitable polymer is one prepared by copolymerizing 89.1 wt. percent vinylidene chloride with 9.9 wt. percent ethyl acrylate and 1 wt. percent of acrylic acid.

The various aspects and modifications of the present invention will be made more clearly apparent by reference to the following description and accompanying example.

*Example 1*

A butyl latex was prepared by emulsifying a 23% NVM solution of butyl rubber in hexane with distilled water in accordance with the following recipe:

| | |
|---|---|
| Butyl rubber solution | 70 parts by wt. |
| Water | 30 parts by wt. |
| Na salt of sulfated nonyl phenoxy ethoxy ethanol | 5 phr. |
| NaH$_2$PO$_4$ | 1 phr. |

The latex was stripped of hexane and concentrated to about 55 wt. percent total rubber solids.

To this latex were added various amounts of a commercial latex prepared by polymerizing 89.1 parts by weight of vinylidene chloride and 9.1 parts of ethyl acrylate and 1% acrylic acid (PVC copolymer). Films were laid down on steel panels from each of these mixtures and tested for film strength, elongation, water absorption and appearance. The following data were obtained:

TABLE I.—PROPERTIES OF BUTYL RUBBER LATEX/POLYVINYLIDENE CAST FILMS

| Butyl rubber PVC copolymer solids ratio | Maximum tensile (p.s.i.) | Elongation (percent) | Water absorption (percent) | Film characteristics |
|---|---|---|---|---|
| 100/0 | 45 | 3,000 | 1.2 | Translucent, flexible, tacky, white. |
| 90/10 | 100 | 3,000 | 4.9 | Translucent, flexible, sl. tack, white. |
| 75/25 | 60 | 3,000 | 3.8 | Opaque, flexible, no tack, lt. yellow. |
| 50/50 | Unable to test | | | Opaque, flexible, no tack, lt. yellow. |
| 25/75 | 100 | 100 | 1.7 | Opaque, sl. flexible, no tack, yellow-orange. |
| 10/90 | 125 | 100 | 2.1 | Opaque, sl. flexible, no tack, yellow-orange. |
| 0/100 | Mud-cracked | | | Hard, brittle, orange. |

These blends were also coated on food board at levels of 2–3 and 7–9 lbs./1000 sq. ft. and the moisture pickup determined at various intervals over a two week period. The data are reported in FIGURES 1 and 2 and in Table II.

TABLE II. — MOISTURE VAPOR PERMEABILITY OF COATED BLEACHED FOOD BOARD EXPOSED AT 95% RELATIVE HUMIDITY AND 100° F.

| PVC Copolymer resin butyl rubber solids ratio | Coating weight lbs./ 1,000 sq. ft. | Approximate coating thickness (mils) | Weight gain/ 100 sq. in./ 24 hrs. |
|---|---|---|---|
| 85/15 | 2–3 | 0.3 | 1.56 |
| 0/100 | 2–3 | 0.5 | 1.49 |
| 85/15 | 7–9 | 1.0 | 1.04 |
| 0/100 | 7–9 | 1.6 | 0.68 |

The above data show that the blends exhibit improved flexibility, and that as little as 5% butyl rubber solids of the total binder weight gives greatly reduced initial moisture vapor transmission rate, but at least 15% or more of butyl rubber is needed to give optimum barrier properties.

*Example 2*

Latices of styrene-butadiene rubber (SBR) and Neoprene were added in the ratio of 15 to 85 wt. percent to a latex of polyvinylidene chloride and films of each of the mixtures were laid down on food board and the moisture pickup determined over a two week period. The following data were obtained.

TABLE III

| Polyvinylidene Chloride Copolymer/Rubber Solids Ratio | Weight Gain/100 Sq. In. | | | | | |
|---|---|---|---|---|---|---|
| Days | 1 | 2 | 4 | 7 | 11 | 14 |
| PVC Latex, 100% | 0.99 | 2.02 | 3.82 | 7.40 | 11.82 | 14.35 |
| SBR Latex, 85/15 | 0.86 | 1.56 | 3.25 | 5.80 | 9.21 | 16.53 |
| Neoprene Latex, 85/15 | 1.00 | 2.05 | 4.18 | 7.33 | 11.53 | 14.89 |
| Butyl Latex, 85/15 | 0.51 | 0.85 | 1.53 | 2.47 | 3.74 | 4.70 |

Each of the above compositions resulted in decreased absorption in the foodboard but again the polyvinylidene coatings were not completely uniform except for the one containing butyl rubber latex. All of the elastomers tested definitely reduced the absorption of the polyvinylidene chloride into the foodboard but because neither SBR nor Neoprene is a good water vapor barrier, high moisture vapor transmission results. Natural rubber latices were also tested in the same ratio but caused increased surface tack. In addition, Neoprene gave a very yellow coating.

Therefore, Examples 1 and 2 show that blends of butyl rubber latex and polyvinylidene chloride films are excellent barriers for water vapor and in addition give films which adequately cover the surfaces to which they are applied.

The nature of the present invention having been thus fully set forth and specific examples of the same given, what is claimed as new and useful and desired to be secured by Letters Patent is:

1. An improved coating composition comprising a mixture of 5 to 50 wt. percent of a butyl rubber latex and 50 to 95 wt. percent of a latex of a polymerization product chosen from the group consisting of polyvinylidene chloride and copolymer of vinylidene chloride with an ester of unsaturated acid and an alcohol of 1 to 10 carbon atoms.

2. The coating composition of claim 1 in which the polymerization product is the copolymer of 89.1 wt. percent of vinylidene chloride, 9.9 wt. percent of ethyl acrylate and 1% of acrylic acid.

References Cited by the Examiner

UNITED STATES PATENTS

| | | | |
|---|---|---|---|
| 2,458,222 | 1/1949 | Talalay | 260—29.7 |
| 2,601,318 | 6/1952 | Navikas | 260—29.7 |

FOREIGN PATENTS

| | | |
|---|---|---|
| 808,730 | 2/1959 | Great Britain. |

MURRAY TILLMAN, *Primary Examiner.*

LOUISE P. QUAST, *Examiner.*

J. ZIEGLER, *Assistant Examiner.*